United States Patent
Lu et al.

(10) Patent No.: US 11,207,670 B2
(45) Date of Patent: Dec. 28, 2021

(54) LOADED MULTIFUNCTIONAL CATALYSIS COMPOSITE MATERIAL, PREPARATION METHOD THEREOF AND APPLICATION OF COMPOSITE MATERIAL TO CATALYTIC REMOVAL OF WATER POLLUTANTS

(71) Applicant: SOOCHOW UNIVERSITY, Suzhou (CN)

(72) Inventors: Jianmei Lu, Suzhou (CN); Najun Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 433 days.

(21) Appl. No.: 16/395,683

(22) Filed: Apr. 26, 2019

(65) Prior Publication Data

US 2019/0329236 A1 Oct. 31, 2019

(30) Foreign Application Priority Data

Apr. 27, 2018 (CN) .......................... 201810394438.0

(51) Int. Cl.
*B01J 37/34* (2006.01)
*B01J 23/80* (2006.01)
(Continued)

(52) U.S. Cl.
CPC ............. *B01J 37/348* (2013.01); *B01J 23/80* (2013.01); *B01J 27/051* (2013.01); *B01J 35/004* (2013.01); *B01J 35/0033* (2013.01); *B01J 35/023* (2013.01); *B01J 37/08* (2013.01); *B82Y 40/00* (2013.01); *C02F 1/30* (2013.01); *C02F 1/4608* (2013.01); *C02F 1/46109* (2013.01); *B01J 2523/27* (2013.01); *B01J 2523/68* (2013.01); *B01J 2523/847* (2013.01); *B82Y 30/00* (2013.01); *C02F 2001/46133* (2013.01);
(Continued)

(58) Field of Classification Search
CPC ...... C02F 1/46; C02F 1/30; C02F 1/72; C02F 1/78; B01J 37/88; B01J 23/80; B01F 35/04
See application file for complete search history.

(56) References Cited

U.S. PATENT DOCUMENTS 9,993,807 B2 * 6/2018 Fecant ................... B01J 19/123

* cited by examiner

Primary Examiner — Walter D. Griffin
Assistant Examiner — Cameron J Allen
(74) Attorney, Agent, or Firm — SZDC Law P.C.

(57) ABSTRACT

The invention discloses a loaded multifunctional catalysis composite material, a preparation method thereof and an application of the composite material to catalytic removal of water pollutants. The preparation method includes the steps: preparing a zinc oxide nano-sheet loaded nickel foam (Ni@ZnO) composite material by an electro-deposition method; compounding molybdenum disulfide micro-nano particles on ZnO porous nano-sheets by an electro-deposition method to obtain Ni@ZnO/$MoS_2$. The composite material Ni@ZnO/$MoS_2$ combines the advantages of components such as nickel foam, the zinc oxide nano-sheets and molybdenum disulfide from the point of material performances, high catalytic degradation activity and recycled performances are achieved, photo-catalysis and electro-catalysis are combined from the point of material application, and the catalytic activity of the composite material is improved by the aid of synergistic effects of photo-catalysis and electro-catalysis.

6 Claims, 2 Drawing Sheets

(51) Int. Cl.
  *B01J 35/00* (2006.01)
  *B01J 35/02* (2006.01)
  *B01J 37/08* (2006.01)
  *C02F 1/30* (2006.01)
  *C02F 1/461* (2006.01)
  *B82Y 40/00* (2011.01)
  *B01J 27/051* (2006.01)
  *C02F 1/46* (2006.01)
  B82Y 30/00 (2011.01)
  C02F 101/30 (2006.01)
(52) U.S. Cl.
  CPC .............. *C02F 2101/30* (2013.01); *C02F 2201/46135* (2013.01); *C02F 2305/10* (2013.01)

LOADED MULTIFUNCTIONAL CATALYSIS COMPOSITE MATERIAL, PREPARATION METHOD THEREOF AND APPLICATION OF COMPOSITE MATERIAL TO CATALYTIC REMOVAL OF WATER POLLUTANTS

This application claims priority to Chinese Patent Application No.: 201810394438.0, filed on Apr. 27, 2018, which is incorporated by reference for all purposes as if fully set forth herein.

FIELD OF THE INVENTION

The present invention belongs to the technical field of metal-inorganic composite materials, specifically relates to a supported multifunctional composite catalyst, the preparation method thereof, and the application for water pollutants removal by photocatalytic, electrocatalytic and photoelectrocatalytic method.

TECHNICAL BACKGROUND

Catalytic technology has been widely studied for degradation of organic pollutants due to its advantages of environmentally friendly, energy saving, high efficiency and low cost. Compared with the precious metal catalyst, metal oxide catalysis has the advantages of low cost and easy synthesis. A variety of oxide semiconductor catalysts has good photocatalytic properties, which also exhibits good electrocatalytic properties and photoelectrocatalytic properties. However, the efficiency of oxide semiconductor catalysts cannot meet the needs of practical applications. Since various catalysts are mostly powders of nanometer-sized particles, it is difficult to recycle and reuse.

SUMMARY OF THE INVENTION

The object of the present invention is to provide a recyclable, multifunctional supported composite catalyst having properties of photocatalysis, electrocatalysis and photoelectrocatalysis. The invention combines semiconductors with different bandgap widths and combines their respective advantages to adjust the performance of the catalyst. So as to combine the narrow-bandgap photocatalyst and the wide-bandgap photocatalyst to achieve a higher light utilization ratio and reduce the combination rate of its photogenerated electrons and holes, thereby improving its photocatalytic performance. On the other hand, as each photocatalyst has different photocatalytic or electrocatalytic properties, the combination of different catalysts can improve the photoelectrocatalytic performance of the composite material.

In order to achieve the above purpose, the invention adopts the follow technical scheme:

A preparation method of a loaded multifunctional catalysis composite material, characterized in that comprising the following steps:

1) preparing zinc oxide nanosheet-loaded nickel foam composite (Ni@ZnO) by electrodeposition using zinc-containing aqueous solution and foamed nickel as raw materials;

2) preparing loaded multifunctional catalysis composite material (Ni@ZnO/$MoS_2$) by electrodeposition method using a sulphur-containing molybdenum compound aqueous solution and said zinc oxide nanosheet-loaded nickel foam composite as raw materials.

The present invention also discloses A catalytic removal method for water pollutants, characterized in that comprising the following steps:

1) preparing zinc oxide nanosheet-loaded nickel foam composite (Ni@ZnO) by electrodeposition using zinc-containing aqueous solution and foamed nickel as raw materials;

2) preparing loaded multifunctional catalysis composite material by electrodeposition method using a sulphur-containing molybdenum compound aqueous solution and said zinc oxide nanosheet-loaded nickel foam composite as raw materials;

3) the loaded multifunctional catalysis composite material is added to the pollutant-containing water, and the catalytic removal of the organic pollutants is completed under electrification and/or light irradiation condition.

The preparation method disclosed by the invention makes ZnO nanosheets easy to recycle and reuse. At the same time, by utilizing the conductive structure of the nickel foam, the photogenerated electrons can be rapidly transferred, and the separation of electrons and holes can be promoted, thereby improving the photocatalytic efficiency. The ZnO nanosheets synthesized by electrodeposition method are porous, which increases the adsorption and photocatalytic active sites of ZnO, and also improves the catalytic performance of the composites. Since the band gap value of $MoS_2$ is narrow, and the band gap of ZnO is wide, the composite photocatalyst is formed by the combination of the two, which can achieve the effect of adjusting the band gap of the material and improve the utilization of light of the composite material; and the conductivity of $MoS_2$ is better, therefore, can improve the electrocatalytic performance of the composite. When the composite material is photocatalyticly degrading water pollutants, under the illumination, $MoS_2$ is first excited by visible light to separate electrons and holes. Photogenerated electrons will be transferred from the conduction band of $MoS_2$ to the conduction band of ZnO, and the holes on the valence band of ZnO will be transferred to the valence band of $MoS_2$, thereby separating electrons and holes quickly and efficiently. At the same time, under external bias, part of the electrons will be transferred from the working electrode to the counter electrode along the external circuit, thereby further separating the electrons and holes on the photocatalyst to improve the catalytic performance of the composite. At this time, the working electrode mainly acts on holes to degrade the contaminants, and the electrons in the counter electrode can also degrade the contaminants. In the catalytic process, the synergistic effect of photocatalysis and electrocatalysis is utilized to achieve rapid degradation of pollutants, and the composite material also has good recycling performance.

In the above technical solution: in the step (1), zinc formate and zinc nitrate hexahydrate are added to water to obtain a zinc-containing aqueous solution; in the electrodeposition method, nickel foam is used as a working electrode, platinum wire is used as a counter electrode, and a calomel electrode is a reference electrode, and the temperature is 25-85° C.; the electrodeposition method is, first, deposited at −1.3 V for 10 s, and then deposited at −1.0 to −0.8 V for 100-300 s; after the electrodeposition is completed, the zinc-containing foamed nickel is dried, and then treating at 350 to 500° C. for 1 to 2 hours under nitrogen protection, to obtain the zinc oxide nanosheet-loaded nickel foam composite material.

Preferably, the molar ratio of zinc formate to zinc nitrate hexahydrate is 1.

In the above technical solution: in the step (2), the thio-containing molybdenum compound and the inorganic salt are added to water to obtain a sulphur-containing molybdenum compound aqueous solution; in the electrodeposition method, the zinc oxide nanosheet-supported nickel foam composite material is used as a working electrode, and the platinum wire is used as a counter electrode, calomel electrode is a reference electrode, the solution temperature is 25-85° C.; the electrodeposition method is, first, deposited at −1.3 V for 10 s, and then deposited at −0.8~−1.0 V for 100-300 s; after the electrodeposition is completed, the molybdenum-containing zinc oxide nanosheet-loaded nickel foam composite is dried and then treated at 500-600° C. for 1 to 2 h under nitrogen protection to obtain a loaded multi-functional catalytic composite by electrodeposition.

Preferably, Thio molybdenum compounds is $(NH_4)_2MoS_4$, inorganic salt is KCl or $Na_2SO_4$; the molar ratio of $(NH_4)_2MoS_4$ and inorganic salt is (0.1~1):1.

In detail, this invention prepared $MoS_2$ supported on Ni@ZnO to obtain Ni foam@ZnO/$MoS_2$ via Electrodeposition method in two steps, which can be prepared as follows:

1. The preparation of Ni@ZnO: One step synthesis of Ni@ZnO by electrodeposition. The electrolyte solution was prepared by dissolving 5 mM $Zn(COOH)_2$ and 5 mM $Zn(NO_3)_3.6H_2O$ in 100 ml aqueous solution with 25~85° C. Electrochemical deposition was performed on an electrochemical workstation. Ni foam was used as the working electrode, platinum electrode was the counter electrode, and calomel electrode was the reference electrode, respectively. Firstly, electrodepositing 10 s under the bias voltage is −0.8~−1.3 V, and electrodepositing 100~300 s under the bias voltage to −1.0 V. After deposition, the Ni foam was dried at 60° C., and heated at 350~500° C. under the protection of nitrogen for 1~2 hour (heating rate of 2° C./min) to obtain Ni foam@ZnO.

2. The preparation of Ni@ZnO/$MoS_2$: Electrolyte solution was prepared by dissolving 0.01~0.1 mmol $(NH_4)_2MoS_4$ and 0.1 mol A in the aqueous solution. Ni@ZnO was used as the working electrode, platinum wire electrode was the counter electrode, and calomel electrode was the reference electrode, respectively. Electrodepositing 100~300 s under an applied bias voltage of −1.0~0.8 V. After the deposition, the Ni foam was dried at 60° C. and heated under a nitrogen atmosphere at 500~600° C. for 2 h (heating rate of 2-5° C./min) to obtain Ni@ZnO/$MoS_2$.

In order to resolve the problem of difficult recovery of powder catalysts, the invention loads nano-size catalysts on macro-size carrier to prepare a supported composite photocatalysts. Especially when choosing the carrier, not only considering its macrosize and good mechanical strength, but also can combine the other characteristics of the carrier to improve the overall performance of the composite material. The photocatalyst is supported on a conductive substrate and the carrier can effectively transfer photo-generated electrons to promote the separation of electrons and holes, thereby improving the photocatalytic performance. The metal foam acts as an electrode supporting material for the electrocatalytic material, which can further improve the electrocatalytic performance of the composite catalyst.

In the above technical solution: in step 3), the light is from a 300 W Xenon lamp, the applied bias voltage of 0.4 V; the water pollution is organic wastewater.

The present invention also discloses a multifunctional supported composite catalyst prepared by above method, and its application for water pollutants removal.

Compared with existing technologies, this invention based on the technical option above had the advantages as followed:

1. The Ni@ZnO composite material involved in the above invention, ZnO porous nano-sheets are supported on Ni foam by electrodeposition, which has the following three advantages. First, ZnO porous nanosheets expose more active sites, which facilitates full contact with pullutions. Second, ZnO is loaded on Ni foam to obtain Ni@ZnO composite, which is beneficial for recycling and reuse. Finally, Ni foam acts as a conductive carrier, which can transfer electrons quickly to reduce the recombination rate of photogenerated electrons and holes, and thus improving the photocatalytic performance of ZnO.

2. $MoS_2$ is a highly conductive semiconductor material that can not only be combined with ZnO, but also improves the light utilization efficiency of ZnO, and it has better electrocatalytic activity, which can improve the catalytic activity of the composite material.

3. Ni@ZnO/$MoS_2$ composite material involved in the above invention, it not only has higher photocatalytic activity, but also has higher electrocatalytic activity and photoelectrocatalytic activity. In the process of photoelectrocatalysis, photoelectrons will be transferred along the external circuit to the platinum electrode under the action of an external bias and light irradiation, so that electrons and holes can be quickly separated, and the recombination rate of photogenerated carriers can be suppressed to increase the catalytic activity of the composite material.

DETAILED DESCRIPTION OF THE INVENTION

The invention will be made a further explanation according to the following figures and the specific implementations.

Implementation 1:

Synthesis of ZnO nanosheets immobilized on Ni foam (Ni@ZnO)

At room temperature, 5 mM zinc formate and 5 mM zinc nitrate hexahydrate were first dissolved in 100 ml of an aqueous solution to prepare an electrolyte solution. Nickel foam is used as the working electrode, platinum wire is used as the counter electrode, and the calomel electrode is used as the reference electrode to connect the circuit. Electrodeposition experiments were carried out under an electrochemical workstation. First, an external bias voltage of −1.3 V was set and electrodeposited for 10 s, then a bias voltage of −1.0 V was set and deposited for 300 s. The sample was taken out from the working electrode and dried under vacuum at 60° C. for 12 h. After being placed at 350° C. (the temperature is 2° C./min), the temperature is 1 h under nitrogen protection. Finally, the obtained nickel foam composite is a zinc oxide nanosheet-loaded nickel foam composite (Ni@ZnO).

Figure 1:
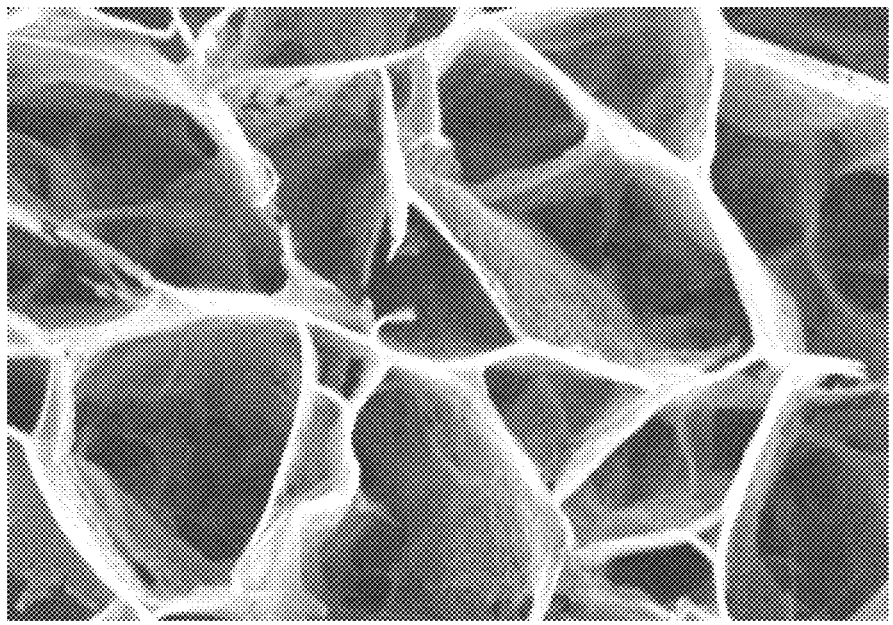
FIG. 1 is the SEM image of ZnO nanosheets immobilized on Ni foam (Ni@ZnO) in implementation 1.

As can be seen from FIG. 1, the ZnO nanosheets are porous nanosheets and are uniformly distributed on the surface of the nickel foam.

Figure 2:
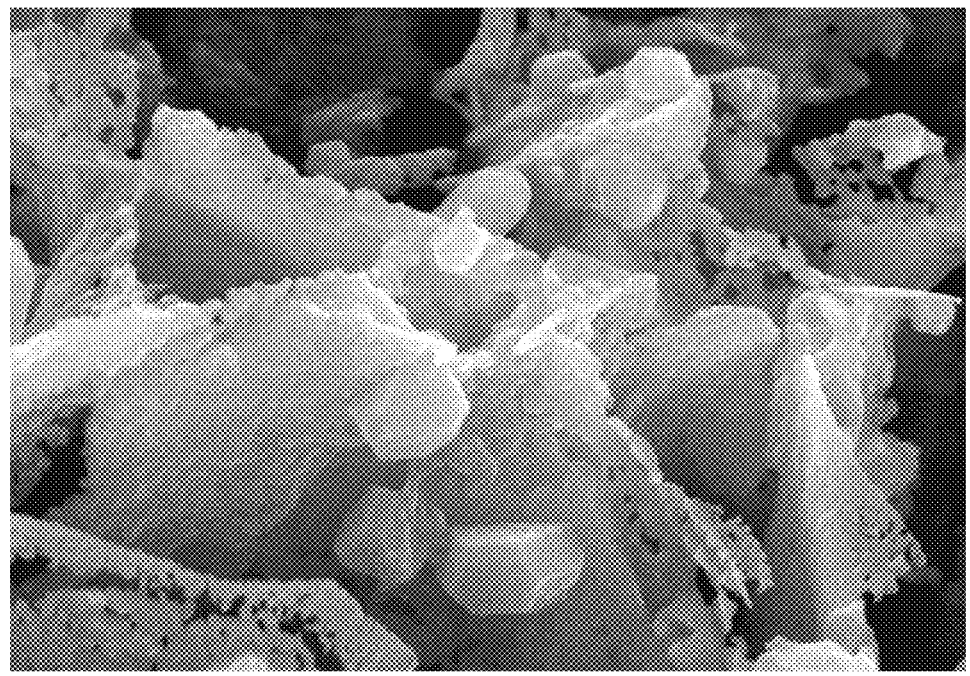
FIG. 2 is the SEM image of $MoS_2$ immobilized on Ni@ZnO (Ni@ZnO/$MoS_2$) in implementation 2.

Implementation 2:

Preparation of molybdenum disulfide micro-nanoparticle composite zinc oxide nanosheet-supported nickel foam composite (Ni@ZnO/$MoS_2$): first dissolve 0.05 mol of tetrathiomolybdate and 0.1 mol of potassium chloride in 100 ml aqueous solution at room temperature, to obtain an electrolyte solution. Ni@ZnO is used as the working electrode, the platinum wire electrode is the counter electrode, and the calomel electrode is used as the reference electrode. After the connection, it is operated on the electrochemical workstation, first deposited for 10 s when the applied bias voltage is −1.3 V, and then at an applied bias of −1.0 V and deposited for 100 s, the sample is taken out from the working electrode and vacuum dried at 60° C. for 12 h. After being placed at 600° C. (the heating rate is 5° C./min), the temperature is kept for 2 hours under nitrogen protection. Finally, the obtained nickel foam composite material is molybdenum disulfide micro-nanoparticle composite zinc oxide nanosheet-loaded nickel foam composite (Ni@ZnO/$MoS_2$). As can be seen from FIG. 2, the $MoS_2$ micro/nanoparticles are uniformly distributed on the ZnO nanosheets.

Implementation 3:

Photocatalytic Degradation of acid red 1 by Ni@ZnO

Taking 1*4 $cm^2$ of Ni@ZnO into 100 mL of acid red 1 solution with a concentration of 20 mg/mL, In the process of photocatalytic degradation, the solution was added 300 W Xenon lamp cold light source with stirring for 1 h, the concentration of the solution was measured at a wavelength of 530 nm by an UV-visible spectrophotometer, and calculate the corresponding acid red in water sample according to the standard working curve. 1 residual concentration. After the test, Ni@ZnO photocatalytic degraded 7% of the above acid red 1 solution after 1 h. The removal rate was 7%. The above results show that under visible light irradiation, the photocatalytic performance of Ni@ZnO is weak, which is mainly due to the wide bandgap of ZnO photocatalyst. The spectral absorption range of the ZnO photocatalyst is mainly in the ultraviolet region and there is little absorption in the visible region.

Implementation 4:

Photocatalytic Degradation of acid red 1 by Ni@ZnO/$MoS_2$

Taking 1*4 $cm^2$ of Ni@ZnO/$MoS_2$ into 100 mL of acid red 1 solution with a concentration of 20 mg/mL, In the process of photocatalytic degradation, the solution was added 300 W Xenon lamp cold light source with stirring for 1 h, the concentration of the solution was measured at a wavelength of 530 nm by an UV-visible spectrophotometer, and calculate the corresponding acid red in water sample according to the standard working curve residual concentration. The experimental results show that Ni@ZnO/$MoS_2$ photocatalytic degrades 34% of the acid red 1 solution after 1 h, which is compared with the photocatalytic performance of Ni@ZnO in implementation 3, the photocatalytic properties of the composite material is greatly improved after loading $MoS_2$.

Implementation 5:

Electcatalytic Degradation of acid red 1 by Ni@ZnO/$MoS_2$

Electrocatalytic experiments were performed on a three-electrode electrochemical station. 1*4 $cm^2$ of Ni@ZnO/$MoS_2$ was used as working electrode, platinum wire electrode was used as the counter electrode and saturated calomel electrode was the reference electrode. Configuring 100 ml of acid red 1 (20 mg/L) containing 0.05 mol of sodium sulfate as the electrolyte solution. After the electrode was installed, an externally biased 0.4 V was applied for 40 minutes. The concentration of the solution was measured at a wavelength of 530 nm by an UV-visible spectrophotometer, and calculate the corresponding acid red in water sample according to the standard working curve residual concentration.

Implementation 6:

Photoelectrochemical Degradation of acid red 1 by Ni@ZnO/$MoS_2$

Figure 3:
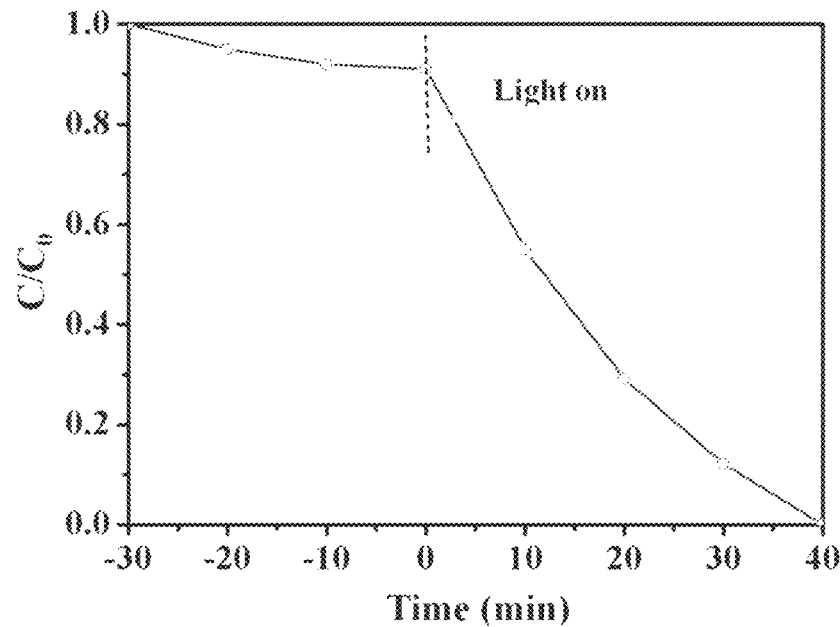
FIG. 3 shows the photoelectrocatalytic degradation patterns (a) of acid red 1 over Ni@ZnO/$MoS_2$ in implementation 6.

Ni@ZnO/$MoS_2$ obtained in Implementation 2 of 1*4 $cm^2$ was weighed and placed in 100 ml of acid red 1 aqueous solution with a concentration of 20 mg/l. 0.71 g of sodium sulfate was added and configured as an electrolyte solution. Ni@ZnO/$MoS_2$ was used as the working electrode, the platinum wire electrode was used as the counter electrode, and the calomel electrode was used as the reference electrode. The electrode was connected and used. First, in the dark, let stand for 30 minutes, then open a 300 W xenon cold light source for irradiation, and use the electrochemical workstation to test the electrolytic solution bias voltage of 0.4 V for photoelectrocatalytic degradation experiments. A sample of 3 ml was taken every 10 minutes, and the absorbance of the water sample at a wavelength of 530 nm was measured by an ultraviolet-visible spectrophotometer, and the residual concentration of acid red 1 in the corresponding water sample was calculated in combination with a standard working curve. FIG. 3 is a graph showing the relationship between the residual rate of acid red 1 and the time in a water sample during a 40 W xenon cold light source irradiation and a 0.4 V bias for 40 min. It can be seen from FIG. 3 that the concentration of the contaminant changes little after 30 minutes of protection from light, and in the process of photoelectrocatalysis, the electron and the space are effectively effective due to the simultaneous illumination and the applied bias. The separation of the holes, thereby improving the catalytic performance, can completely degrade all of the acid red 1 after 40 minutes of catalysis.

Implementation 7:

Recycled photoelectrochemical degradation of acid red 1 by Ni@ZnO/$MoS_2$

The stability and reusability performance of Ni@ZnO/$MoS_2$ was tested by photoelectrocatalytic experiment, in which the condition was keep by above-mentioned test. In detail, Ni@ZnO/$MoS_2$ was taken out by tweezers and dried for next degradation experiment. The dye solution was the 100 ml of acid red 1 (20 mg/L). In detail, 1*4 $cm^2$ of Ni@ZnO/$MoS_2$ from implementation 2 were used as the working electrode, and the platinum wire electrode was used as the counter electrode. The saturated calomel electrode is a reference electrode. Configuring 100 ml of acid red 1 (20 mg/L) containing 0.05 mol of sodium sulfate as the electrolyte solution. After the electrode was installed, an external bias voltage of 0.4 V was applied, and the working electrode was irradiated with light for 40 minutes, and the concentration of the test solution was sampled every 10 minutes. The concentration of the solution was measured at a wavelength of 530 nm by an UV-visible spectrophotometer, and calculate the corresponding acid red in water sample according to the standard working curve residual concentration.

Figure 4:
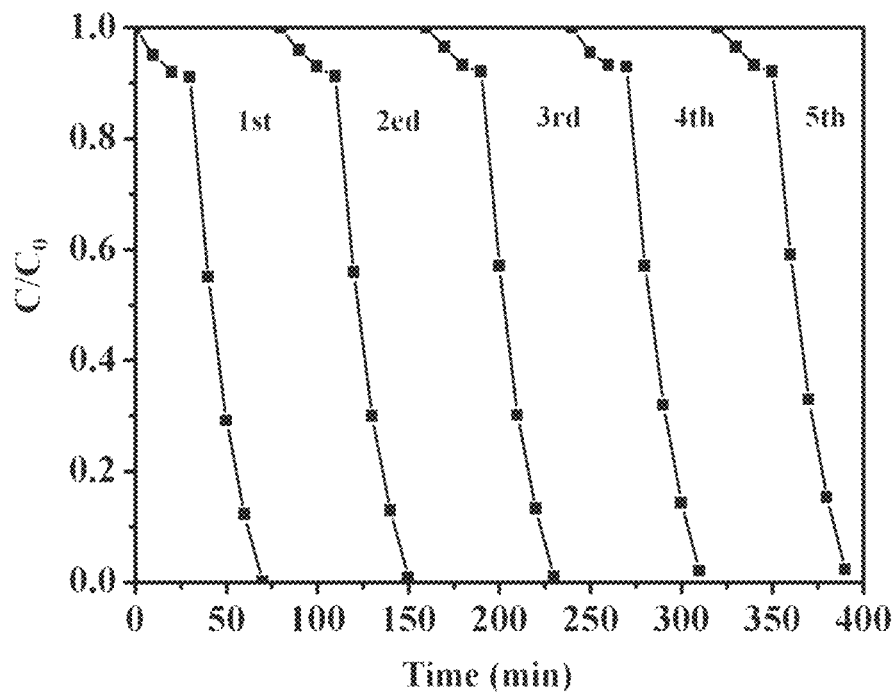
FIG. 4 shows the recycle of the Ni@ZnO/$MoS_2$ for degradation of acid red 1 in implementation 7.

In FIG. 4, the photoelectrocatalytic degradation experiment in implementation 6 is repeated and totally reused for five times. As shown in FIG. 4, Ni@ZnO/$MoS_2$ has stable catalytic performance after the fifth cycle catalytic experiments. It demonstrated that Ni@ZnO/MoS$_2$ has good stability. In the recycling process, the composite material can be taken out easily from the solution by tweezers, which is much more convenient than nanoparticles in practical application.

When using the catalyst of the invention to remove the pollutants from water, a bias voltage is applied as well as under the light irradiation. Biased voltage can force the directional movement of photo-generated electrons, greatly accelerate the separation of photo-generated electrons and holes. Therefore, this photoelectrocatalytic degradation technology (electric field assisted photocatalysis) will have more application prospects.

What we claim is:

1. A preparation method of a loaded multifunctional catalysis composite material, characterized in that comprising the following steps:
    1) preparing a zinc oxide nanosheet-loaded nickel foam composite by a first electrodeposition method using a zinc-containing aqueous solution and foamed nickel as raw materials; and
    2) preparing a loaded multifunctional catalysis composite material by a second electrodeposition method using a sulphur-containing molybdenum compound aqueous solution and said zinc oxide nanosheet-loaded nickel foam composite as raw materials,
    wherein:
    in the step (1), zinc formate and zinc nitrate hexahydrate are added to water to obtain the zinc-containing aqueous solution; in the first electrodeposition method, nickel foam is used as a working electrode, platinum wire is used as a counter electrode, and a calomel electrode is a reference electrode, and the temperature of the zinc-containing aqueous solution is 25-85° C.; the first electrodeposition method is, first, deposited at −1.3 V for 10 s, and then deposited at −1.0 to −0.8 V for 100-300 s; after the first electrodeposition is completed, the zinc-containing foamed nickel is dried, and then treating at 350 to 500° C. for 1 to 2 hours under nitrogen protection, to obtain the zinc oxide nanosheet-loaded nickel foam composite material; and
    in the step (2), a thio-containing molybdenum compound and an inorganic salt are added to water to obtain the sulphur-containing molybdenum compound aqueous solution; in the second electrodeposition method, a zinc oxide nanosheet-supported nickel foam composite material is used as a working electrode, and the platinum wire is used as a counter electrode, calomel electrode is a reference electrode, the temperature of the sulphur-containing molybdenum compound aqueous solution is 25-85° C.; the second electrodeposition method is, first, deposited at −1.3 V for 10 s, and then deposited at −0.8~−1.0 V for 100-300 s; after the second electrodeposition is completed, the molybdenum-containing zinc oxide nanosheet-loaded nickel foam composite is dried and then treated at 500-600° C. for 1 to 2 h under nitrogen protection to obtain a loaded multi-functional catalytic composite by electrodeposition.

2. The preparation method of a loaded multifunctional catalysis composite material according to claim 1, wherein the molar ratio of zinc formate to zinc nitrate hexahydrate is 1; the thiomolybdenum compound is tetrathiomolybdate, the inorganic salt is potassium chloride or sodium sulfate; the molar ratio of the tetrathiomolybdate to the inorganic salt is (0.1 to 1):1.

3. A catalytic removal method for water pollutants, characterized in that comprising the following steps:
    1) preparing a zinc oxide nanosheet-loaded nickel foam composite by a first electrodeposition method using a zinc-containing aqueous solution and foamed nickel as raw materials;
    2) preparing a loaded multifunctional catalysis composite material by a second electrodeposition method using a sulphur-containing molybdenum compound aqueous solution and said zinc oxide nanosheet-loaded nickel foam composite as raw materials; and
    3) the loaded multifunctional catalysis composite material is added to the pollutant-containing water, and the catalytic removal of the organic pollutants is completed under electrification and/or light irradiation condition,
    wherein:
    in the step (1), zinc formate and zinc nitrate hexahydrate are added to water to obtain the zinc-containing aqueous solution; in the first electrodeposition method, nickel foam is used as a working electrode, platinum wire is used as a counter electrode, and a calomel electrode is a reference electrode, and the temperature of the zinc-containing aqueous solution is 25-85° C.; the first electrodeposition method is, first, deposited at −1.3 V for 10 s, and then deposited at −1.0 to −0.8 V for 100-300 s; after the first electrodeposition is completed, the zinc-containing foamed nickel is dried, and then treating at 350 to 500° C. for 1 to 2 hours under nitrogen protection, to obtain the zinc oxide nanosheet-loaded nickel foam composite material; and
    in the step (2), a thio-containing molybdenum compound and an inorganic salt are added to water to obtain a sulphur-containing molybdenum compound aqueous solution; in the second electrodeposition method, a zinc oxide nanosheet-supported nickel foam composite material is used as a working electrode, and the platinum wire is used as a counter electrode, calomel electrode is a reference electrode, the solution temperature of the sulphur-containing molybdenum compound aqueous solution is 25-85° C.; the second electrodeposition method is, first, deposited at −1.3 V for 10 s, and then deposited at −0.8~−1.0 V for 100-300 s; after the second electrodeposition is completed, the molybdenum-containing zinc oxide nanosheet-loaded nickel foam composite is dried and then treated at 500-600° C. for 1 to 2 h under nitrogen protection to obtain a loaded multi-functional catalytic composite by electrodeposition.

4. The catalytic removal method for water pollutants according to claim 3, wherein the thiomolybdenum compound is tetrathiomolybdate, the inorganic salt is potassium chloride or sodium sulfate; the molar ratio of the tetrathiomolybdate to the inorganic salt is (0.1 to 1):1.

5. The catalytic removal method for water pollutants according to claim 3, wherein in the step (3), the illumination is 300 W xenon cold light source illumination, and the voltage applied is 0.4 V; the pollutant is an organic pollutant.

6. A loaded multifunctional catalysis composite material prepared by the preparation method of a loaded multifunctional catalysis composite material according to claim 1.

* * * * *